US012783878B2

(12) United States Patent
Gao et al.

(10) Patent No.: US 12,783,878 B2
(45) Date of Patent: Nov. 3, 2026

(54) METHOD FOR TRAINING A CONDITIONAL NEURAL PROCESS FOR DETERMINING A POSITION OF AN OBJECT FROM IMAGE DATA

(71) Applicant: Robert Bosch GmbH, Stuttgart (DE)

(72) Inventors: Ning Gao, Nufringen (DE); Anh Vien Ngo, Nehren (DE); Gerhard Neumann, Karlsruhe (DE); Hanna Ziesche, Leonberg (DE); Michael Volpp, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 792 days.

(21) Appl. No.: 18/167,733

(22) Filed: Feb. 10, 2023

(65) Prior Publication Data

US 2023/0274142 A1 Aug. 31, 2023

(30) Foreign Application Priority Data

Feb. 28, 2022 (DE) ..................... 10 2022 202 030.8

(51) Int. Cl.

*G06N 3/08* (2023.01)
*G06N 3/045* (2023.01)
(Continued)

(52) U.S. Cl.

CPC ............... *G06N 3/08* (2013.01); *G06N 3/045* (2023.01); *G06N 3/0499* (2023.01); *G06N 3/084* (2013.01);
(Continued)

(58) Field of Classification Search

CPC ............ G06N 3/08; G06N 3/09; G06N 3/045; G06N 3/0499; G06N 3/084; G06N 3/0985; G06V 10/225; G06V 10/82
See application file for complete search history.

(56) References Cited

U.S. PATENT DOCUMENTS

| | | | | |
|---|---|---|---|---|
| 2023/0074706 A1* | 3/2023 | Xiao | ..................... | G06F 18/213 |
| 2023/0081171 A1* | 3/2023 | Zhang | ..................... | G06T 11/00 382/157 |
| 2023/0088676 A1* | 3/2023 | She | ....................... | G06F 21/562 706/25 |

FOREIGN PATENT DOCUMENTS

WO 2019099305 A1 5/2019

OTHER PUBLICATIONS

Gondal, M.W., Joshi, S., Rahaman, N., Bauer, S., Wuthrich, M. and Schã¶kopf, B., Jul. 2021. Function contrastive learning of transferable meta-representations. In International Conference on Machine Learning (pp. 3755-3765). PMLR. (Year: 2021).*

He, Y., Sun, W., Huang, H., Liu, J., Fan, H. and Sun, J., 2020. Pvn3d: A deep point-wise 3d keypoints voting network for 6dof pose estimation. In Proceedings of the IEEE/CVF conference on computer vision and pattern recognition (pp. 11632-11641). (Year: 2020).*

(Continued)

*Primary Examiner* — Omar F Fernandez Rivas
(74) *Attorney, Agent, or Firm* — NORTON ROSE FULBRIGHT US LLP

(57) ABSTRACT

A method for training a conditional neural process for determining a position of an object from image data. The method includes: providing training data for training the conditional neural process, wherein the training data comprise labeled image data showing a particular object and labeled comparison image data regarding the particular object; and training the conditional neural process based on the provided training data, wherein the training of the conditional neural process comprises applying functional contrastive learning, and wherein the training of the conditional neural process comprises applying an end-to-end learning approach.

14 Claims, 2 Drawing Sheets

(51) Int. Cl.
*G06N 3/0499* (2023.01)
*G06N 3/084* (2023.01)
*G06N 3/09* (2023.01)
*G06N 3/0985* (2023.01)
*G06V 10/22* (2022.01)
*G06V 10/82* (2022.01)

(52) U.S. Cl.
CPC ............. *G06N 3/09* (2023.01); *G06N 3/0985* (2023.01); *G06V 10/225* (2022.01); *G06V 10/82* (2022.01)

(56) References Cited

OTHER PUBLICATIONS

Le, T., Jang, S. and Lien, J.J.J., 2020. 3D Visual-guided Robot Arm Control for a Warehouse Automation System. International Journal of iRobotics, 3(4), pp. 1-8. (Year: 2020).*

Gondal et al., "Function Contrastive Learning of Transferable Meta-Representations," Proceedings of the 38th International Conference on Machine Learning, PMLR, vol. 139, 2021, pp. 1-11.

Chen et al., "A Simple Framework for Contrastive Learning of Visual Representations," Proceedings of the 37th International Conference on Machine Learning, PMLR, vol. 119, 2020, pp. 1-11.

Garnelo et al., "Conditional Neural Processes," Proceedings of the 35th International Conference on Machine Learning, PMLR, vol. 80, 2018, pp. 1-10.

* cited by examiner

METHOD FOR TRAINING A CONDITIONAL NEURAL PROCESS FOR DETERMINING A POSITION OF AN OBJECT FROM IMAGE DATA

CROSS REFERENCE

The present application claims the benefit under 35 U.S.C. § 119 of German Patent Application No. DE 10 2022 202 030.8 filed on Feb. 28, 2022, which is expressly incorporated herein by reference in its entirety.

FIELD

The present invention relates to a method for training a conditional neural process for determining a position of an object from image data, and in particular to a method for training a conditional neural process for determining a position of an object from image data, with which a conditional neural process for determining a position of an object from image data with optimized performance can be trained with comparatively low resource consumption.

BACKGROUND INFORMATION

The term "meta-learning algorithm" is understood to mean a machine learning algorithm designed to optimize the algorithm by autonomous learning as well as drawing on experiences. Such meta-learning algorithms are in particular applied to metadata, wherein the metadata maybe, for example, properties of the corresponding learning problem, algorithm properties or patterns, which were previously derived from the data. The application of such meta-learning algorithms in particular has the advantage that the performance of the algorithm can be increased and the algorithm can be adapted quickly and flexibly to different problems and/or new categories of objects. Such meta-learning algorithms are used, for example, to determine a position and/or pose, or 6D-pose, of an object based on image data.

Meta-learning algorithms include, for example, model-agnostic meta-learning (MAML) or conditional neural processes. The aim of these algorithms is to optimize model parameters in such a way that training success can be achieved with comparatively few gradient optimizations. Conditional neural processes are in particular based on using a feed-forward neural network to calculate the training data information, to aggregate this information, and to transmit this information to another feed-forward network for inference.

However, it proves disadvantageous with such meta-learning algorithms, for example, that the training of such algorithms is comparatively complex and can lead to so-called overfitting or memorization of training data. In particular, during the training of such an algorithm, a state can occur in which only problem solutions determined from the training data are reproduced, that is, the algorithm correctly processes only the training data and does not achieve any new results when new data are input.

PCT Patent Application No. WO 2019/099305 A1 describes a method for automating the learning of several tasks by a single neural network based on meta-learning, wherein the order in which tasks are learned by the neural network can affect the performance of the network, and wherein a task-level plan can be used for learning the several tasks. The plan provides for monitoring a course of cost functions during the training, wherein compensatory weights for task losses can be adjusted in the course of the training.

SUMMARY

An object of the present invention is to provide an improved method for training a meta-learning algorithm and in particular a conditional neural process for determining a position of an object from image data.

The object may be achieved with a method for training a conditional neural process for determining a position of an object from image data according to the features of the present invention.

The object may also be achieved with a control device for training a conditional neural process for determining a position of an object from image data according to the features of the present invention.

According to one example embodiment of the present invention, this object may be achieved by a method for training a conditional neural process for determining a position of an object from image data, wherein the method comprises providing training data for training the conditional neural process, wherein the training data comprise labeled image data showing a particular object and labeled comparison image data regarding the particular object; and training the conditional neural process based on the provided training data, wherein the training of the conditional neural process comprises applying functional contrastive learning, and wherein the training of the conditional neural process comprises applying an end-to-end learning approach.

The term "image data" is understood to mean data that are generated by scanning or optically recording one or more surfaces by means of an optical or electronic device or an optical sensor.

The image data showing a particular object are image data that show a surface on which the particular object is placed or positioned, and were recorded for training purposes.

The comparison image data regarding the particular object furthermore are comparison or context data and in particular digital images, which likewise represent the respective particular object for comparison or as a reference.

The term "labeled data" is furthermore understood to mean already known data that have already been prepared, for example, from which features, such as the position or nature of individual objects in the corresponding image data have already been extracted or from which patterns have already been derived.

Contrastive learning furthermore consists in learning a metric space between two sample values by reducing the distance between two positive sample values while increasing the distance between two negative sample values. The term "functional contrastive learning" is in particular understood to mean an algorithm designed to reduce the distance between two corresponding representations, in particular the distance or difference between two representations relating to the same task or the same object, and to find matching representations.

The term "end-to-end learning approach" is furthermore understood to mean an approach based on input and output data of a neural network, wherein the neural network is trained on output data desired with respect to an input or corresponding input data.

The combination of functional contrastive learning and an end-to-end learning approach in particular has the advantage that the performance of the correspondingly trained conditional neural process, and in particular the accuracy in determining the position of an object, can be optimized, which proves advantageous in particular for specific practical tasks.

Moreover, the conditional neural process can be trained with comparatively low resource consumption, in particular with comparatively low memory and processor capacities, especially since the individual representations are coordinated with one another.

Specified overall is thus an improved method for training a meta-learning algorithm and in particular a conditional neural process for determining a position of an object from image data.

According to an example embodiment of the present invention, the step of training the conditional neural process based on the provided training data can in this case comprise generating first latent representations based on the labeled image data and information about the labeled image data; generating second latent representations based on the labeled comparison image data and information about the labeled comparison image data; determining, by means of the functional contrastive learning, a first cost function based on the first latent representations and the second latent representations; and training the conditional neural process based on the first cost function.

The term "latent representations" is understood to mean intermediate states of the input data or image data during the processing of the image data by the conditional neural process, wherein the latent representations usually have a smaller dimension than the original image data.

The term "information about the labeled image data or labeled comparison image data" is furthermore understood to mean information about the patterns or labels contained in the comparison image data, for example, information about the position of individual objects represented in the image data or comparison image data.

The term "cost function" or "loss" is furthermore understood to mean a loss or an error between determined output values and corresponding actual circumstances or actual measured data.

Overall, the conditional neural process can thus be trained in a simple manner with simultaneously comparatively low resource consumption, wherein the performance of the trained conditional neural process can simultaneously be optimized.

According to an example embodiment of the present invention, the step of training the conditional neural process based on the provided training data may furthermore also comprise determining, by means of the conditional neural process, a position of the particular object in the image data based on the labeled image data, the labeled comparison image data and information about the labeled comparison image data; determining a comparison position of the particular object in the labeled image data based on information about the labeled image data; determining a second cost function based on the determined position of the particular object in the image data and the comparison position of the particular object; and training the conditional neural process based on the second cost function.

The conditional neural process can also again be trained thereby in a simple manner with simultaneously comparatively low resource consumption, wherein the performance of the trained conditional neural process can simultaneously be optimized.

In one example embodiment of the present invention, the image data and the comparison image data respectively are image data showing complete images.

The term "image data showing complete images" or "higher-dimensional image data" is understood to mean image data that characterize, or represent, not only a part, for example, a two-dimensional portion of an image or individual pixels of an image, but the complete image.

In particular, the method according to the present invention can train a conditional neural process designed to process even complete images in a simple manner or to determine the position of objects from complete images in a simple manner, wherein the performance of a correspondingly trained conditional neural process can be optimized even further.

With a further example embodiment of the present invention, a method for determining a position of an object is also specified, wherein the method comprises providing image data, wherein the image data comprise target image data showing the object and labeled comparison image data regarding the object; providing a conditional neural process, trained by a method described above for training a conditional neural network for determining a position of an object from image data, for determining a position of an object from image data; and determining, by means of the provided conditional neural process for determining a position of an object from image data, the position of the object based on the provided image data.

Such a method for determining a position of an object has the advantage that it is based on an improved method for training a meta-learning algorithm and in particular a conditional neural process for determining a position of an object from image data. In particular, the combination of functional contrastive learning and an end-to-end learning approach in the training of the conditional neural process has the advantage that the performance of the correspondingly trained conditional neural process, and in particular the accuracy in determining the position of an object, can be optimized, which proves advantageous in particular for specific practical tasks. Moreover, the conditional neural process can be trained with comparatively low resource consumption, in particular with comparatively low memory and processor capacities, especially since the individual representations are coordinated with one another.

With a further example embodiment of the present invention, a method for controlling a controllable system is also specified, which comprises determining a position of an object from image data by means of a method described above for determining a position of an object, and controlling a controllable system based on the determined position of the object.

The controllable system may, for example, be a robotic system, wherein the robotic system may in turn be a gripper robot, for example. However, the system may also be, for example, a system for controlling or navigating an autonomously driving motor vehicle or a system for face recognition.

Such a method for controlling a controllable system has the advantage that it is based on an improved method for training a meta-learning algorithm and in particular a conditional neural process for determining a position of an object from image data. In particular, the combination of functional contrastive learning and an end-to-end learning approach in the training of the conditional neural process has the advantage that the performance of the correspondingly trained conditional neural process, and in particular the accuracy in determining the position of an object, can be optimized, which proves advantageous in particular for specific practical tasks. Moreover, the conditional neural process can be trained with comparatively low resource consumption, in particular with comparatively low memory and processor capacities, especially since the individual representations are coordinated with one another.

With a further example embodiment of the present invention, a control device for training a conditional neural process for determining a position of an object from image data is also specified, wherein the control device comprises a provisioning unit designed to provide training data for training the conditional neural process, wherein the training data comprise labeled image data showing a particular object and labeled comparison image data regarding the particular object; and a training unit designed to train the conditional neural process based on the provided training data, wherein the training of the conditional neural process comprises applying functional contrastive learning, and wherein the training of the conditional neural process comprises applying an end-to-end learning approach.

Specified is thus an improved control device for training a meta-learning algorithm and in particular a conditional neural process for determining a position of an object from image data. In particular, the combination of functional contrastive learning and an end-to-end learning approach in the training of the conditional neural process has the advantage that the performance of the correspondingly trained conditional neural process, and in particular the accuracy in determining the position of an object, can be optimized, which proves advantageous in particular for specific practical tasks. Moreover, the conditional neural process can be trained with comparatively low resource consumption, in particular with comparatively low memory and processor capacities, especially since the individual representations are coordinated with one another.

In this case, according to an example embodiment of the present invention, the training unit may furthermore comprise a first generation unit designed to generate first latent representations based on the labeled image data and information about the labeled image data; a second generation unit designed to generate second latent representations based on the labeled comparison image data and information about the labeled comparison image data; and a first determination unit designed to determine, by means of the functional contrastive learning, a first cost function based on the first latent representations and the second latent representations, wherein the training unit may be designed to train the conditional neural process based on the first cost function. Overall, the training unit can thus be designed in such a way that the conditional neural process can be trained in a simple manner with simultaneously comparatively low resource consumption, wherein the performance of the trained conditional neural process can simultaneously be optimized.

Moreover, according to an example embodiment of the present invention, the training unit may furthermore comprise a second determination unit designed to determine, by means of the conditional neural process, a position of the particular object in the image data based on the labeled image data, the labeled comparison image data and information about the labeled comparison image data; a third determination unit designed to determine a comparison position of the particular object in the labeled image data based on information about the labeled image data; and a fourth determination unit designed to determine a second cost function based on the determined position of the particular object in the image data and the comparison position of the particular object, wherein the training unit may be designed to train the conditional neural process based on the second cost function. The conditional neural process can also again be trained thereby in a simple manner with simultaneously comparatively low resource consumption, wherein the performance of the trained conditional neural process can simultaneously be optimized.

In one example embodiment of the present invention, the image data and the comparison image data respectively are image data showing complete images. In particular, the control device according to the present invention can train a conditional neural process designed to process even complete images in a simple manner or to determine the position of objects from complete images in a simple manner, wherein the performance of a correspondingly trained conditional neural process can be optimized even further.

With a further example embodiment of the present invention, a control device for determining a position of an object is moreover also specified, wherein the control device comprises a provisioning unit designed to provide image data, wherein the image data comprise target image data showing the object and labeled comparison image data regarding the object; a reception unit designed to receive a conditional neural process, trained by a control device described above for training a conditional neural network for determining an object from image data, for determining a position of an object from image data; and a determination unit designed to determine, by means of the provided conditional neural process for determining a position of an object from image data, the position of the object based on the provided image data.

Such a control device for determining a position of an object has the advantage that it is based on a conditional neural process, trained by an improved control device for training a meta-learning algorithm and in particular a conditional neural process for determining a position of an object from image data, for determining a position of an object from image data. In particular, the combination of functional contrastive learning and an end-to-end learning approach in the training of the conditional neural process has the advantage that the performance of the correspondingly trained conditional neural process, and in particular the accuracy in determining the position of an object, can be optimized, which proves advantageous in particular for specific practical tasks. Moreover, the conditional neural process can be trained with comparatively low resource consumption, in particular with comparatively low memory and processor capacities, especially since the individual representations are coordinated with one another.

With a further example embodiment of the present invention, a control device for controlling a controllable system is furthermore also specified, wherein the control device comprises a reception unit designed to receive a position of an object determined by a control device described above for determining a position of an object; and a control unit designed to control the controllable system based on the determined position of the object.

Such a control device for controlling a controllable system has the advantage that it is based on a conditional neural process, trained by an improved control device for training a meta-learning algorithm and in particular a conditional neural process for determining a position of an object from image data, for determining a position of an object from image data. In particular, the combination of functional contrastive learning and an end-to-end learning approach in the training of the conditional neural process has the advantage that the performance of the correspondingly trained conditional neural process, and in particular the accuracy in determining the position of an object, can be optimized, which proves advantageous in particular for specific practical tasks. Moreover, the conditional neural process can be trained with comparatively low resource consumption, in particular with comparatively low memory and processor capacities, especially since the individual representations are coordinated with one another.

In summary, it can be noted that the present invention provides a method for training a conditional neural process for determining a position of an object from image data, with which a conditional neural process for determining a position of an object from image data with optimized performance can be trained with comparatively low resource consumption.

The described embodiments and developments of the present invention can be combined with one another as desired.

Further possible embodiments, developments and implementations of the present invention also include not explicitly mentioned combinations of features of the present invention described above or below with respect to exemplary embodiments.

BRIEF DESCRIPTION OF THE DRAWINGS

The figures are intended to provide a further understanding of example embodiments of the present invention. They illustrate example embodiments and, in connection with the description, serve to explain principles and concepts of the present invention.

Other embodiments and many of the mentioned advantages become apparent from the figures. The illustrated elements of the figures are not necessarily shown to scale with respect to one another.

DETAILED DESCRIPTION OF EXAMPLE EMBODIMENTS

In the figures, identical reference signs denote identical or functionally identical elements, parts or components, unless stated otherwise.

Figure 1:
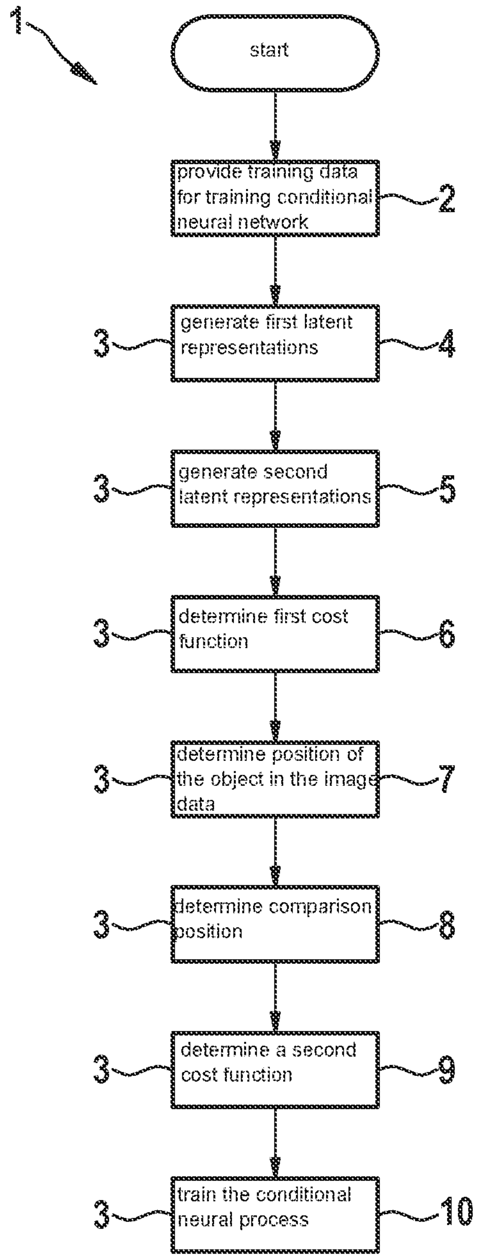
FIG. 1 shows a flow chart of a method for training a conditional neural process for determining a position of an object from image data according to embodiments of the present invention.

FIG. 1 shows a flow chart of a method for training a conditional neural process for determining a position of an object from image data 1 according to embodiments of the present invention.

The present invention relates to a method for training a conditional neural process for determining a position of an object from image data, and in particular to a method for training a conditional neural process for determining a position of an object from image data, with which a conditional neural process for determining a position of an object from image data with optimized performance can be trained with comparatively low resource consumption.

The term "meta-learning algorithm" is understood to mean a machine learning algorithm designed to optimize the algorithm by autonomous learning as well as drawing on experiences. Such meta-learning algorithms are in particular applied to metadata, wherein the metadata may, for example, be properties of the corresponding learning problem, algorithm properties, or patterns previously derived from the data. The application of such meta-learning algorithms in particular has the advantage that the performance of the algorithm can be increased and the algorithm can be adapted quickly and flexibly to different problems and/or new categories of objects. Such meta-learning algorithms are used, for example, to determine a position and/or pose, or 6D-pose, of an object based on image data.

Meta-learning algorithms include, for example, model-agnostic meta-learning (MAML) or conditional neural processes. The aim of these algorithms is to optimize model parameters in such a way that training success can be achieved with comparatively few gradient optimizations. Conditional neural processes are in particular based on using a feed-forward neural network to calculate the training data information, to aggregate this information, and to route this information to another feed-forward network for inference.

However, it proves disadvantageous with such meta-learning algorithms, for example, that the training of such algorithms is comparatively complex and can lead to so-called overfitting or memorization of training data. In particular, during the training of such an algorithm, a state can occur in which only problem solutions determined from the training data are reproduced, that is, the algorithm correctly processes only the training data and does not achieve any new results when new data are input.

FIG. 1 shows a method for training a conditional neural process for determining a position of an object from image data, which comprises a step 2 of providing training data for training the conditional neural process, wherein the training data comprise labeled image data showing a particular object and labeled comparison image data regarding the particular object; and a step 3 of training the conditional neural process based on the provided training data, wherein the training of the conditional neural process comprises applying functional contrastive learning, and wherein the training of the conditional neural process comprises applying an end-to-end learning approach.

The combination of functional contrastive learning and an end-to-end learning approach in particular has the advantage that the performance of the correspondingly trained conditional neural process, and in particular the accuracy in determining the position of an object, can be optimized, which proves advantageous in particular for specific practical tasks.

Moreover, the conditional neural process can be trained with comparatively low resource consumption, in particular with comparatively low memory and processor capacities, especially since the individual representations are coordinated with one another.

Specified overall is thus an improved method for training a meta-learning algorithm and in particular a conditional neural process for determining a position of an object from image data 1.

In this respect, it has also been shown that better performance can in particular be achieved with a thus trained conditional neural process than with comparable model-agnostic meta-learning.

The amount of image data showing a particular object may also be different from the amount of corresponding comparison data, wherein these amounts may also differ depending on the application or task.

The method may furthermore also comprise a step of capturing current image data showing the particular object, wherein the captured image data can be processed correspondingly and can subsequently be provided as image data showing the particular object.

According to the embodiments of FIG. 1, the step 3 of training the conditional neural process based on the provided training data in this case comprises a step 4 of generating first latent representations based on the labeled image data and information about the labeled image data; a step 5 of generating second latent representations based on the labeled comparison image data and information about the labeled comparison image data; a step 6 of determining, by means of the functional contrastive learning, a first cost function based on the first latent representations and the second latent representations; and a step of training the conditional neural process based on the first cost function.

As FIG. 1 shows, the step 3 of training the conditional neural process based on the provided training data moreover comprises a step 7 of determining, by means of the conditional neural process, a position of the particular object in the image data based on the labeled image data, the labeled comparison image data and information about the labeled comparison image data; a step 8 of determining a comparison position of the particular object in the labeled image data based on information about the labeled image data; a step 9 of determining a second cost function based on the determined position of the object in the image data and the comparison position of the object; and a step of training the conditional neural process based on the second cost function.

According to the exemplary embodiments of FIG. 1, the first cost function and the second cost function are combined to form a common cost function, wherein the step of training the conditional neural process based on the first cost function and the step of training the conditional neural process based on the second cost function are combined to form a step 10 of training the conditional neural process based on the common cost function. The training may comprise, for example, backpropagating the common cost function through the network layers and utilizing it to adapt the corresponding network weights.

The image data and the comparison image data respectively are image data showing complete images, wherein the image data may in particular be higher-dimensional image data.

The trained conditional neural process may subsequently be utilized, for example, to determine a position and/or a pose of an object in image data. Furthermore, the trained conditional neural process may however also be used to recognize abnormalities in image data, for example.

The determined position and/or pose of the object may subsequently be used, for example, to control a controllable system, for example, to control a robot arm to grip the object. Furthermore, the determined position or pose may however also be used, for example, to control or navigate an autonomous vehicle based on an identified target vehicle or for facial recognition.

Figure 2:
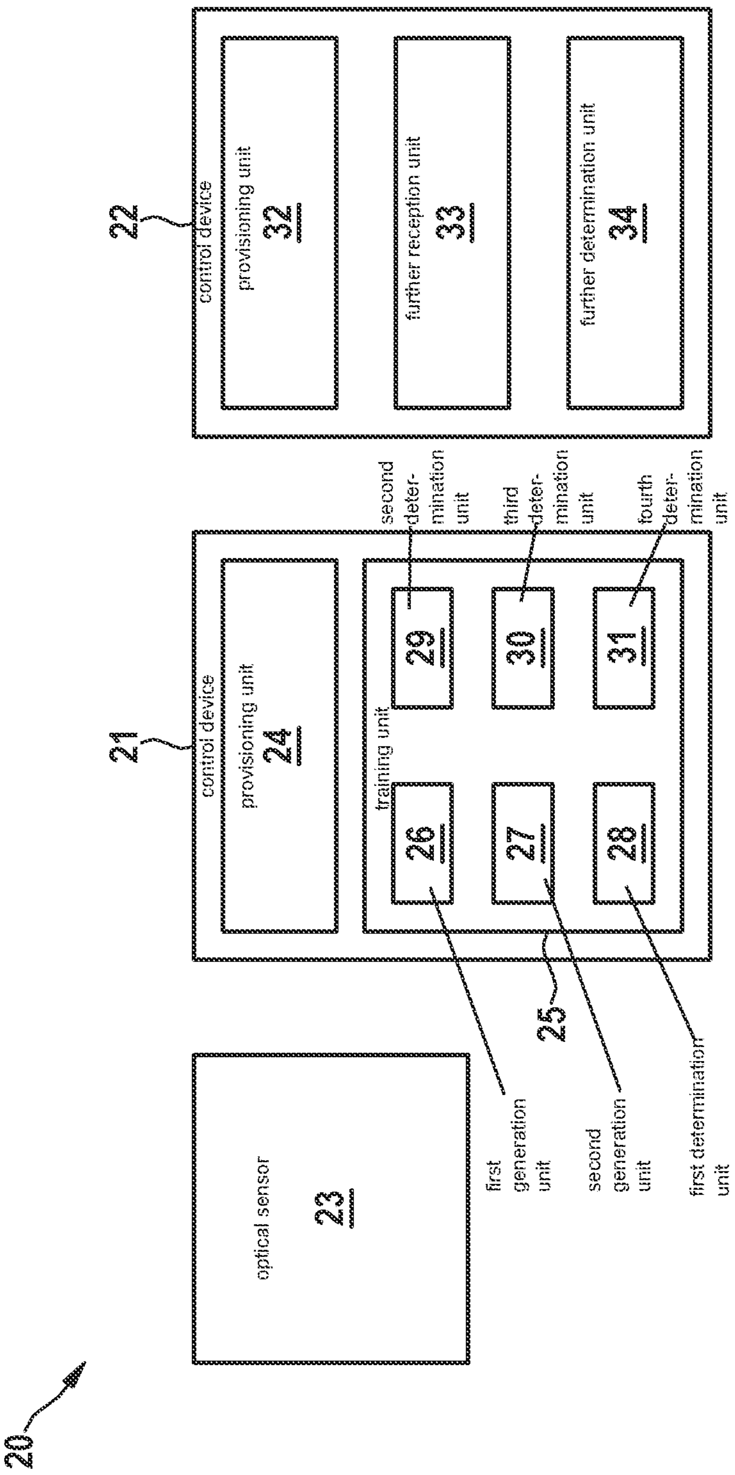
FIG. 2 shows a schematic block diagram of a system for determining a position of an object according to embodiments of the present invention.

FIG. 2 shows a schematic block diagram of a system for determining a position of an object 20 according to embodiments of the present invention.

As FIG. 2 shows, the system 20 comprises a control device for training a conditional neural process for determining a position of an object from image data 21 and a control device for determining a position of an object 22. An optical sensor 23 designed to capture current image data can also be seen.

According to the embodiments of FIG. 2, the control device for training a conditional neural process for determining a position of an object from image data 21 comprises a provisioning unit 24 designed to provide training data for training the conditional neural process, wherein the training data comprise labeled image data showing a particular object and labeled comparison image data regarding the particular object; and a training unit 25 designed to train the conditional neural process based on the provided training data, wherein the training of the conditional neural process comprises applying functional contrastive learning, and wherein the training of the conditional neural process comprises applying an end-to-end learning approach.

The provisioning unit may, for example, be a receiver designed to receive the image data, for example from one or more optical sensors. The training unit may furthermore be implemented, for example, based on code that is stored in a memory and can be executed by a processor.

As FIG. 2 shows, the training unit 25 furthermore comprises a first generation unit 26 designed to generate first latent representations based on the labeled image data and information about the labeled image data; a second generation unit 27 designed to generate second latent representations based on the labeled comparison image data and information about the labeled comparison image data; and a first determination unit 28 designed to determine, by means of the functional contrastive learning, a first cost function based on the first latent representations and the second latent representations, wherein the training unit 25 is designed to train the conditional neural process based on the first cost function.

The first generation unit, the second generation unit and the first determination unit can in turn be respectively implemented, for example, based on code that is stored in a memory and can be executed by a processor.

As FIG. 2 furthermore shows, the training unit 25 furthermore comprises a second determination unit 29 designed to determine, by means of the conditional neural process, a position of the particular object in the image data based on the labeled image data, the labeled comparison image data and information about the labeled comparison image data; a third determination unit 30 designed to determine a comparison position of the particular object in the labeled image data based on information about the labeled image data; and a fourth determination unit 31 designed to determine a second cost function based on the determined position of the object in the image data and the comparison position of the object, wherein the training unit 25 is designed to train the conditional neural process based on the second cost function.

The second determination unit, the third determination unit and the fourth determination unit can in turn be respectively implemented, for example, based on code that is stored in a memory and can be executed by a processor.

Furthermore, the image data and the comparison image data in turn respectively are image data showing complete images.

According to embodiments of FIG. 2, the control device for determining a position of an object 22 furthermore comprises a further provisioning unit 32 designed to provide image data, wherein the image data comprise target image data showing the object and labeled comparison image data regarding the object; a further reception unit 33 designed to receive a conditional neural process, trained by the control device for training a conditional neural network for determining a position of an object from image data, for determining a position of an object from image data; and a further determination unit 34 designed to determine, by means of the provided conditional neural process for determining an object from image data, the position of the object based on the provided image data.

The further provisioning unit and the further reception unit may each, for example, be appropriately designed receivers. Furthermore, the further determination unit may in turn be implemented, for example, based on code that is stored in a memory and can be executed by a processor.

According to the embodiments of FIG. 2, the target image data are furthermore current representations, recorded by the optical sensor 23, of a surface on which the object is currently located or positioned.

What is claimed is:

1. A method for training a conditional neural process for determining a position of an object from image data, the method comprising the following steps:

providing training data for training the conditional neural process, wherein the training data include labeled image data showing a particular object and labeled comparison image data regarding the particular object; and training the conditional neural process based on the provided training data, wherein the training of the conditional neural process includes applying functional contrastive learning, and the training of the conditional neural process includes applying an end-to-end learning approach, wherein the step of training the conditional neural process based on the provided training data furthermore includes the following steps:

generating first latent representations based on the labeled image data and information about the labeled image data;

generating second latent representations based on the labeled comparison image data and the information about the labeled comparison image data;

determining, using the functional contrastive learning, a first cost function based on the first latent representations and the second latent representations; and training the conditional neural process based on the first cost function.

2. The method according to claim 1, wherein the step of training the conditional neural process based on the provided training data furthermore includes the following steps:

determining, using the conditional neural process, a position of the particular object in the image data based on the labeled image data, the labeled comparison image data, and information about the labeled comparison image data;

determining a comparison position of the particular object in the labeled image data based on the information about the labeled image data;

determining a second cost function based on the determined position of the particular object in the image data and the comparison position of the particular object; and training the conditional neural process based on the second cost function.

3. The method according to claim 1, wherein an amount of the labeled image data showing the particular object is different from an amount of the labeled comparison image data regarding the particular object.

4. A method for determining a position of an object, the method comprising the following steps:

providing image data, wherein the image data include target image data showing the object and labeled comparison image data regarding the object;

providing a trained conditional neural process, the conditional neural process being trained for determining a position of an object from image data by:

providing training data for training the conditional neural process, wherein the training data include labeled image data showing a particular object and labeled comparison image data regarding the particular object; and training the conditional neural process based on the provided training data, wherein the training of the conditional neural process includes applying functional contrastive learning, and the training of the conditional neural process includes applying an end-to-end learning approach; and determining, using the trained conditional neural process for determining a position of an object from image data, the position of the object based on the provided image data, wherein the step of training the conditional neural process based on the provided training data furthermore includes the following steps:

generating first latent representations based on the labeled image data and information about the labeled image data;

generating second latent representations based on the labeled comparison image data and the information about the labeled comparison image data;

determining, using the functional contrastive learning, a first cost function based on the first latent representations and the second latent representations; and training the conditional neural process based on the first cost function.

5. The method according to claim 4, wherein an amount of the labeled image data showing the particular object is different from an amount of the labeled comparison image data regarding the particular object.

6. A method for controlling a controllable system, the method comprising the following steps:

determining a position of an object by:

providing image data, wherein the image data include target image data showing the object and labeled comparison image data regarding the object;

providing a trained conditional neural process, the conditional neural process being trained for determining a position of an object from image data by:

providing training data for training the conditional neural process, wherein the training data include labeled image data showing a particular object and labeled comparison image data regarding the particular object; and training the conditional neural process based on the provided training data, wherein the training of the conditional neural process includes applying functional contrastive learning, and the training of the conditional neural process includes applying an end-to-end learning approach; and determining, using the trained conditional neural process for determining a position of an object from image data, the position of the object based on the provided image data; and controlling the controllable system based on the determined position of the object, wherein the step of training the conditional neural process based on the provided training data furthermore includes the following steps:

generating first latent representations based on the labeled image data and information about the labeled image data;

generating second latent representations based on the labeled comparison image data and the information about the labeled comparison image data;

determining, using the functional contrastive learning, a first cost function based on the first latent representations and the second latent representations; and training the conditional neural process based on the first cost function.

7. The method according to claim 6, wherein an amount of the labeled image data showing the particular object is different from an amount of the labeled comparison image data regarding the particular object.

8. A control device for training a conditional neural process for determining a position of an object from image data, the control device comprising:
- a provisioning unit configured to provide training data for training the conditional neural process, wherein the training data include labeled image data showing a particular object and labeled comparison image data regarding the particular object; and
- a training unit configured to train the conditional neural process based on the provided training data, wherein the training of the conditional neural process includes applying functional contrastive learning, and the training of the conditional neural process includes applying an end-to-end learning approach, wherein the training unit includes:
- a first generation unit configured to generate first latent representations based on the labeled image data and information about the labeled image data;
- a second generation unit configured to generate second latent representations based on the labeled comparison image data and information about the labeled comparison image data; and
- a first determination unit configured to determine, using the functional contrastive learning, a first cost function based on the first latent representations and the second latent representations, and wherein the training unit is configured to train the conditional neural process based on the first cost function.

9. The control device according to claim 8, wherein the training unit includes:
- a second determination unit configured to determine, using the conditional neural process, a position of the particular object in the image data based on the labeled image data, the labeled comparison image data, and the information about the labeled comparison image data;
- a third determination unit configured to determine a comparison position of the particular object in the labeled image data based on the information about the labeled image data; and
- a fourth determination unit configured to determine a second cost function based on the determined position of the object in the image data and the comparison position of the object;
- wherein the training unit is configured to train the conditional neural process based on the second cost function.

10. The control device according to claim 8, wherein an amount of the labeled image data showing the particular object is different from an amount of the labeled comparison image data regarding the particular object.

11. A control device for determining a position of an object, the control device comprising:
- a provisioning unit configured to provide image data, wherein the image data comprise target image data showing the object and labeled comparison image data regarding the object;
- a reception unit configured to receive a trained conditional neural process, the conditional neural process being trained by a control device for training a conditional neural network for determining a position of an object from image data for determining a position of an object from image data, the control device for training including:
  - a provisioning unit configured to provide training data for training the conditional neural process, wherein the training data include labeled image data showing a particular object and labeled comparison image data regarding the particular object; and
  - a training unit configured to train the conditional neural process based on the provided training data, wherein the training of the conditional neural process includes applying functional contrastive learning, and the training of the conditional neural process includes applying an end-to-end learning approach; and
- a determination unit configured to determine, using the provided trained conditional neural process for determining an object from image data, the position of the object based on the provided image data, wherein the training unit includes:
- a first generation unit configured to generate first latent representations based on the labeled image data and information about the labeled image data;
- a second generation unit configured to generate second latent representations based on the labeled comparison image data and information about the labeled comparison image data; and
- a first determination unit configured to determine, using the functional contrastive learning, a first cost function based on the first latent representations and the second latent representations, and wherein the training unit is configured to train the conditional neural process based on the first cost function.

12. The control device according to claim 11, wherein an amount of the labeled image data showing the particular object is different from an amount of the labeled comparison image data regarding the particular object.

13. A control device for controlling a controllable system, the control device comprising:
- a reception unit configured to receive a position of an object determined by a control device for determining a position of an object including:
  - a provisioning unit configured to provide image data, wherein the image data comprise target image data showing the object and labeled comparison image data regarding the object;
  - a reception unit configured to receive a trained conditional neural process, the conditional neural process being trained by a control device for training a conditional neural network for determining a position of an object from image data for determining a position of an object from image data, the control device for training including:
    - a provisioning unit configured to provide training data for training the conditional neural process, wherein the training data include labeled image data showing a particular object and labeled comparison image data regarding the particular object; and
    - a training unit configured to train the conditional neural process based on the provided training data, wherein the training of the conditional neural process includes applying functional contrastive learning, and the training of the conditional neural process includes applying an end-to-end learning approach; and
  - a determination unit configured to determine, using the provided trained conditional neural process for determining an object from image data, the position of the object based on the provided image data; and a control unit configured to control the controllable system based on the determined position of the object, wherein the training unit includes:

a first generation unit configured to generate first latent representations based on the labeled image data and information about the labeled image data;

a second generation unit configured to generate second latent representations based on the labeled comparison image data and information about the labeled comparison image data; and a first determination unit configured to determine, using the functional contrastive learning, a first cost function based on the first latent representations and the second latent representations, and wherein the training unit is configured to train the conditional neural process based on the first cost function.

14. The control device according to claim 13, wherein an amount of the labeled image data showing the particular object is different from an amount of the labeled comparison image data regarding the particular object.

* * * * *